(12) United States Patent
Jordan

(10) Patent No.: US 7,837,180 B2
(45) Date of Patent: *Nov. 23, 2010

(54) GAS SPRING SUSPENSION SYSTEM

(75) Inventor: Brian Jordan, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/175,547

(22) Filed: Jul. 18, 2008

(65) Prior Publication Data

US 2008/0272570 A1    Nov. 6, 2008

Related U.S. Application Data

(63) Continuation of application No. 11/162,537, filed on Sep. 14, 2005, now Pat. No. 7,401,800.

(51) Int. Cl.
*B62K 25/08* (2006.01)
(52) U.S. Cl. .................................... 267/64.26; 280/276
(58) Field of Classification Search ................. 188/300, 188/312, 322.15, 322.19, 322.22; 267/64.11, 267/64.15, 64.26; 280/275, 276

See application file for complete search history.

(56) References Cited

U.S. PATENT DOCUMENTS

| | | | |
|---|---|---|---|
| 5,195,766 A | 3/1993 | Dohrmann et al. |
| 5,417,446 A | 5/1995 | Pileggi |
| 5,580,075 A | 12/1996 | Turner et al. |
| 6,105,988 A | 8/2000 | Turner et al. |
| 6,135,434 A | 10/2000 | Marking |
| 6,505,719 B2 | 1/2003 | Gonzalez et al. |
| 6,581,948 B2 | 6/2003 | Fox |
| 6,592,136 B2 | 7/2003 | Becker et al. |

*Primary Examiner*—Christopher P Schwartz
(74) *Attorney, Agent, or Firm*—Milan Milosevic; Lisa Serdynski

(57) ABSTRACT

A gas spring suspension system that maximizes the travel of the suspension system. The suspension system includes an outer tube and an inner tube slidable within the outer tube. A piston assembly is slidably mounted in the inner tube to sealingly separate a positive spring and a negative gas chamber. A floating piston is slidably mounted in the inner tube to separate a gas chamber from the negative gas chamber. The positive spring biases the inner and outer tubes apart from each other and the negative gas chamber biases the inner and outer tubes toward each other. The floating piston is configured to slidably displace within the inner tube in response to pressure differentials between the negative gas chamber and the gas chamber.

10 Claims, 3 Drawing Sheets

GAS SPRING SUSPENSION SYSTEM

RELATED APPLICATION DATA

This application is a continuation of U.S. application Ser. No. 11/162,537 filed on Sep. 14, 2005, entitled "Gas Spring Suspension System."

BACKGROUND OF THE INVENTION

The present invention relates to suspension systems, and more particularly to a gas spring suspension system that includes a floating piston to maximize the travel of the suspension system.

Bicycles include suspension systems to cushion the rider from irregularities in the terrain. Bicycle suspension systems are typically located at the front fork, seat tube or at other bicycle frame locations. A typical front suspension fork includes two legs, each leg having upper and lower telescoping tubes. At least one leg includes a resilient member for biasing the upper and lower tubes apart from each other and for absorbing compressive forces applied to the fork. The resilient member may be a coil spring, an elastomeric spring, a gas spring or the like.

The maximum amount the upper and lower tubes may compress relative to each other is commonly referred to as the travel of the fork. Early suspension forks were capable of about 50 mm of travel. However, as riders began to traverse rougher terrain at higher speeds, a greater amount of travel was needed to absorb the higher riding forces. Thus, later suspension forks were designed with travel settings of 140 mm or more.

Another concern of bicyclists is the overall weight of the bicycle. Typically, a coil spring or an elastomeric suspension fork adds unnecessary weight to the bicycle. To reduce the weight of the fork, a gas spring may be used. The gas spring may include a positive gas chamber to bias the upper and lower tubes apart from each other and a negative gas chamber to bias the upper and lower tubes toward each other. However, a disadvantage of such a gas spring is that during compression the entire length of the upper tube is not used. Accordingly, there is a need to provide a gas spring that uses the entire length of the upper tube.

SUMMARY OF THE INVENTION

The present invention provides a gas spring suspension system generally including a first tube, a second tube slidable within the first tube, a piston assembly, a floating piston slidably mounted within the second tube, a positive spring, a negative gas chamber and a gas chamber. The first and second tubes have first and second ends. The positive spring biases the first and second tubes apart from each other and the negative gas chamber biases the first and second tubes toward each other. The gas chamber is located between the floating piston and the second end of the first tube. The gas in the gas chamber is usually air trapped during assembly of the suspension. The floating piston has a configuration such that when the pressure in the gas chamber is greater than the pressure in the negative gas chamber, the floating piston displaces within the second tube to decrease the pressure in the gas chamber.

In one embodiment of the present invention, the gas spring suspension system is used in a bicycle suspension fork wherein the first tube is a lower tube and the second tube is an upper tube slidable within the lower tube. When the fork is compressed, the volume of the negative gas chamber increases and the pressure in the negative gas chamber decreases, while the volume of the gas chamber decreases and the pressure in the gas chamber increases. If the pressure in the gas chamber is greater than the pressure in the negative gas chamber, the floating piston displaces within the upper tube to equalize the pressures in the negative gas chamber and the gas chamber. This configuration prevents high pressure in the gas chamber that would prevent the fork from achieving full travel.

In this embodiment of the suspension system, a cap assembly seals the first end of the upper tube and an end plate encloses the second end of the upper tube. The piston assembly includes a piston and a piston rod having a first end attached to the piston and a second end attached to the second end of the lower tube. The piston rod has a central bore for receiving an inflation valve to inflate the negative gas chamber. The negative gas chamber includes two volumes, the volume inside the central bore of the piston rod and the volume between the piston and the floating piston. The floating piston is slidably mounted between the piston and the end plate and includes a central bore for receiving the piston rod therethrough. The gas chamber is located between the floating piston and the second end of the lower tube. The end plate does not form a seal with the upper tube so that when the gas chamber pressure is greater than the negative gas chamber pressure, the gas below the end plate displaces the floating piston toward the cap assembly to equalize the pressures in the negative gas chamber and the gas chamber.

These and other features and advantages of the present invention will be more fully understood from the following description of a certain embodiment of the invention, taken together with the accompanying drawings.

DETAILED DESCRIPTION

Figure 1:
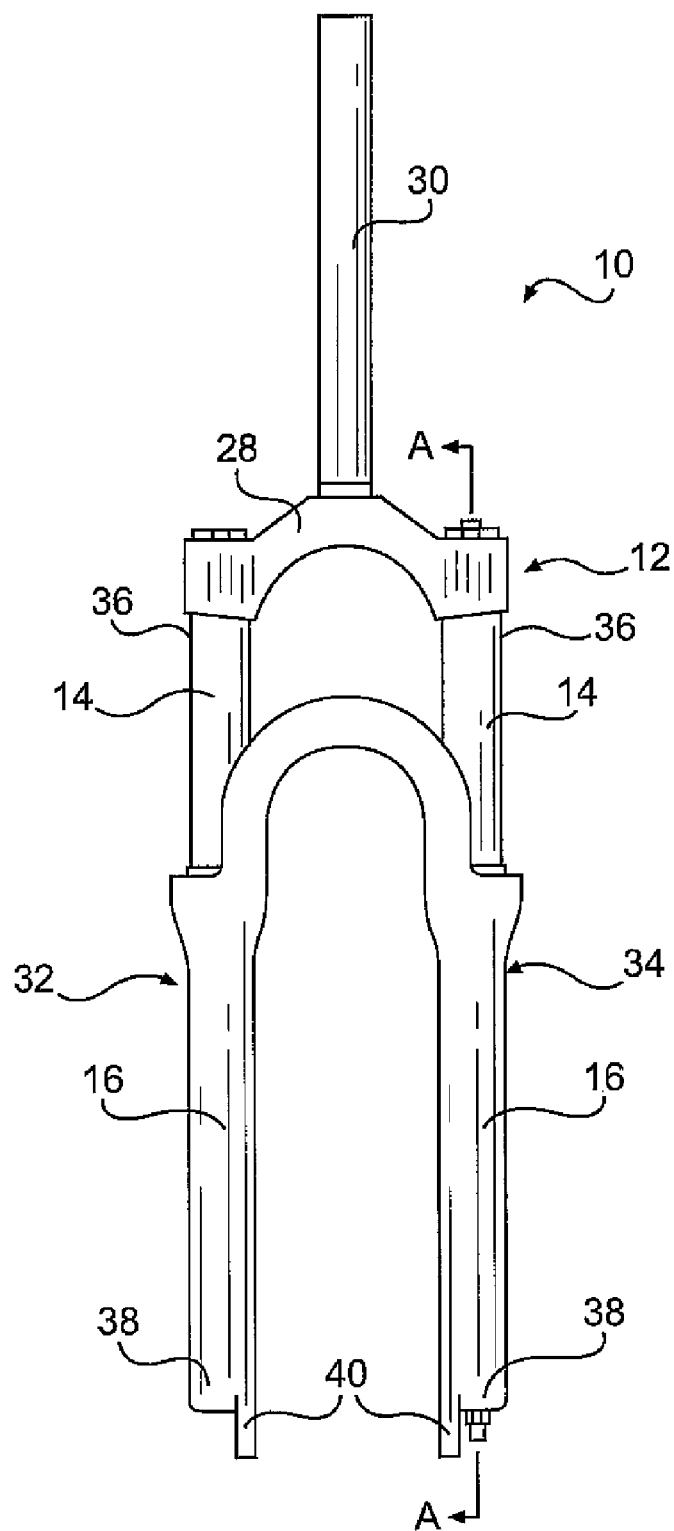
FIG. 1 is a front view of a bicycle suspension fork including a gas spring suspension system in accordance with one embodiment of the present invention.
Figure 2:
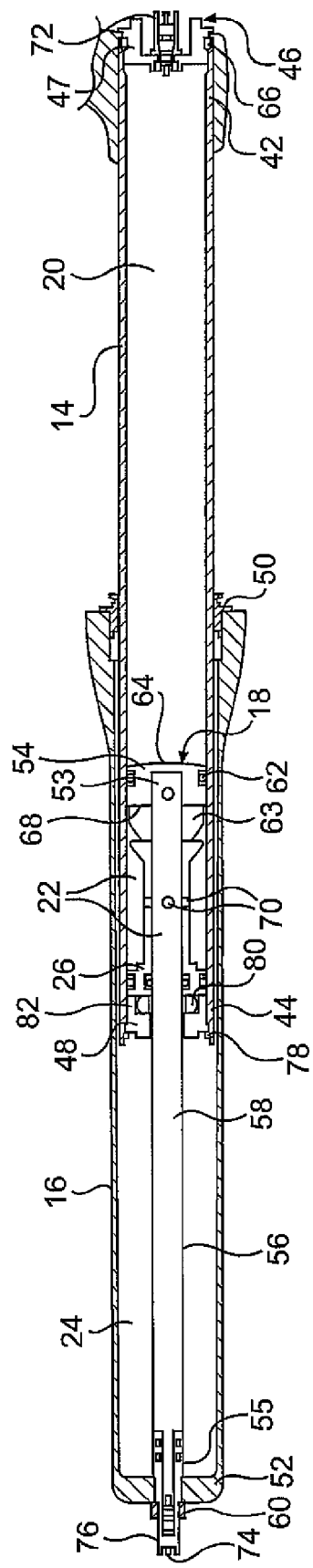
FIG. 2 is a cross-sectional view taken along line A-A of a leg of the suspension fork of FIG. 1 containing the gas spring suspension system.
Figure 3:
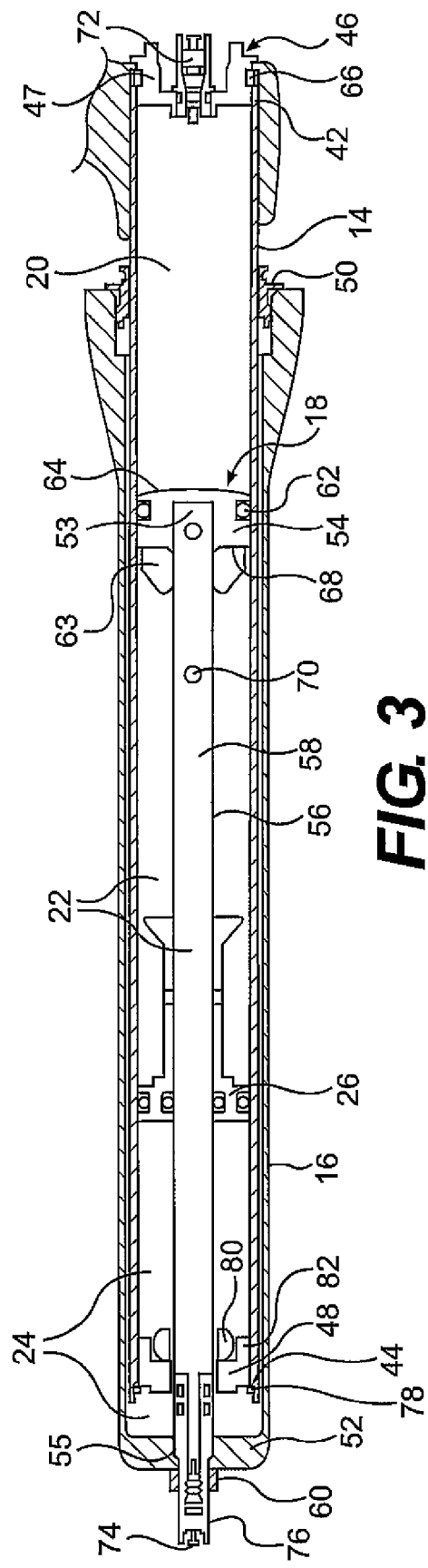
FIG. 3 is a cross-sectional view of the fork leg shown in FIG. 2 showing the fork under compression.

FIGS. 1-3 illustrate a bicycle front suspension fork 10 that includes a gas spring suspension system 12 in accordance with one embodiment of the present invention. The gas spring assembly 12 generally includes an upper tube 14 slidable in a lower tube 16, a piston assembly 18, first, second and third gas chambers 20, 22, 24 and a floating piston 26 slidably mounted in the upper tube 14. Looking to FIG. 1, the fork 10 includes a crown 28 that is connected to a steerer tube 30, a first leg 32 and second leg 34. Each of the legs 32, 34 includes the upper tube 14 slidable within the lower tube 16. Alternatively, the lower tube may be slidable within the upper tube. The upper and lower tubes 14, 16 are connected at their remotes ends 36 to the crown 28 and at remote end s38 to a wheel axle (not shown) through dropouts 40. It is to be understood that although the present invention is described with respect to a front suspension fork, the gas spring suspension may be also embodied in a rear shock, seat post, or at other locations on a bicycle frame. Further, the gas spring suspension system of the present invention may be used on motorcycles as well as other handlebar-steered vehicles.

Looking to FIG. 2, the upper tube 14 slides within the lower tube 16 during compression and rebound of the suspension system. The upper tube 14 has a first end 42 sealed by a cap assembly 46 and a second end 44 is enclosed by an end plate 48. The piston assembly 18 generally includes a piston 54 and a piston rod 56 having a central bore 58. The piston 54 is slidably mounted within the upper tube 14 for reciprocation therein in response to compression or rebound of the upper and lower tubes 14, 16 relative to each other. The piston rod 56 has first end 53 connected to the piston 54 and extends through the second end 44 of the upper tube 14. A second end 55 of the piston rod 56 is secured to the lower tube 16 by a nut 60. The piston 54 includes an O-ring 62 that forms a gas-tight seal with the upper tube 14. The piston assembly 18 may further include a top-out bumper 63 to absorb the impact of the piston 54 contacting the floating piston 26 during rebound. The top-out bumper 63 is disposed adjacent to a first surface 68 of the piston 54.

The first gas chamber 20 is located between the cap assembly 46 and a second surface 64 of the piston 54. The cap assembly 46 includes a cap 47 having an O-ring 66 that forms a gas-tight seal with an inner wall of the upper tube 14. The first gas chamber 20 functions as a positive spring that biases the upper and lower tubes 14, 16 toward each other. The second gas chamber functions as a negative spring that biases the upper and lower tubes 14, 16 toward each other. The distance between the second end 44 of the upper tube 14 and the second end 52 of the lower tube 16 is called the travel of the fork 10. The second gas chamber 22 includes two volumes, the volume inside of the central bore 58 of the piston rod 56 and the volume between the first surface 68 of the piston 54 and the floating piston 26. The two volumes of the second gas chamber 22 are in constant communication through passages 70 in the piston rod 56 and thus the two volumes function as a single volume. The cap assembly 46 also includes a first inflation valve such as a Schrader valve 72 threaded into the cap 47 for pressurizing the first gas chamber 20 with gas. The second gas chamber 22 is pressurized with gas through a second inflation valve such as a Schrader valve 74 disposed in the central bore 58 at the second end 55 of the piston rod 56. The third gas chamber 24 is located between the floating piston 26 and the second end 52 of the lower tube 16. The gas in the third gas chamber 24 is air trapped during assembly of the fork 10.

The floating piston 26 is slidably mounted within a lower end of the upper tube 14. The floating piston 26 is slidable along the piston rod 56 and the upper tube 14 and is biased against the end plate 48 by the pressure of the second gas chamber 22 and the piston 54. The floating piston 26 includes internal and external O-rings that form a gas-tight seal with the piston rod 56 and the upper tube 14, respectively. The floating piston 26 is prevented from being forced out of the upper tube 14 by the end plate 48. A retaining ring 78 fixes the end plate 48 to the second end 44 of the upper tube 14. Alternatively, the end plate 48 may be formed integrally with the second end 44 of the upper tube 14. The end plate 48 does not form a gas-tight seal with the upper tube 14. Further, the end plate 48 may include a bumper 80 absorbs the impact of the floating piston 26 contacting the end plate 48 and a compression limiter 82 that ensures the bumper 80 is not overstressed during rebound.

FIG. 2 shows the fork leg 34 in an uncompressed or an extended state and FIG. 3 shows the fork leg 34 in a compressed state. When the fork is compressed, the piston 54 displaces towards the first end 42 of the upper tube 14, increasing the pressure in the first gas chamber 20 and decreasing the pressure in the second gas chamber 22. While the volume of the third gas chamber 24 decreases and the pressure in the third gas chamber 24 increases. When the pressure in the third gas chamber 24 exceeds the pressure in the second gas chamber 22, the floating piston 26 displaces towards the first end 42 of the upper tube 14, resulting in a decrease in the pressure in the third gas chamber 24 and an increase in the pressure in the second gas chamber 22. By the floating piston 26 displacing in the upper tube 14, a high pressure in the third gas chamber 24 is prevented, resulting in the fork 10 achieving a maximum length of travel. Further, during compression, the displacement of the floating piston 26 is minimal effect on the function of the second gas chamber 22, since the second gas chamber 22 is used when the fork 10 is extended.

While this invention has been described by reference to a preferred embodiment, it should be understood that numerous changes could be made within the spirit and scope of the inventive concepts described. Accordingly, it is intended that the invention not be limited to the disclosed embodiment, but that it have the full scope permitted by the language of the following claims.

What is claimed is:

1. A gas spring suspension system comprising:
   an outer tube having first and second ends;
   an inner tube slidable within the outer tube, the inner tube having first and second ends;
   a piston assembly slidably mounted in the inner tube to sealingly separate a positive spring from a negative gas chamber that is a negative spring; and
   a floating piston slidably mounted in the inner tube to sealingly separate a gas chamber from the negative gas chamber,
   the positive spring biasing the inner and outer tubes apart from each other, the negative gas chamber biasing the inner and outer tube toward each other, the floating piston configured to slidably displace within the inner tube in response to pressure differentials between the negative gas chamber and the gas chamber.

2. The gas spring suspension system of claim 1, wherein when the pressure in the gas chamber is greater than the pressure in the negative gas chamber, the floating piston displaces toward the first end of the inner tube.

3. The gas spring suspension system of claim 1, wherein the inner tube includes a cap assembly for sealing the first end of the inner tube and an unsealed end plate at the second end of the inner tube.

4. The gas spring suspension system of claim 1, wherein the piston assembly further includes a piston rod having a first end attached to a piston slidably mounted within the inner tube and a second end attached to the second end of the outer tube, the piston having a central bore for receiving an inflation valve to pressurize the second gas chamber, the second gas chamber including two volumes, the volume inside the central bore of the piston rod and the volume between the piston and the floating piston, central bore having passages to distribute the gas throughout the negative gas chamber.

5. The gas spring suspension system of claim 4, wherein the positive spring is located between the first end of the inner tube and the piston.

6. The gas spring suspension system of claim 5, wherein the negative gas chamber is located between the piston and the floating piston.

7. The gas spring suspension of claim 6, wherein the negative gas chamber is located between the piston and the second end of the inner tube, the floating piston is biased toward the second end of the inner tube by the pressure in the negative gas chamber.

8. The gas spring suspension of claim 7, wherein the floating piston includes a central bore for receiving the piston rod therethrough, the floating piston slidably mounted about the piston rod.

9. The gas spring suspension of claim 8, wherein the piston assembly includes an O-ring disposed between the piston and the inner tube for providing a seal between the piston and the inner tube.

10. The gas spring suspension of claim 9, wherein when the pressure in the gas chamber is less than the pressure in the negative gas chamber, the floating piston displaces toward the second end of the inner tube.

* * * * *